T. PENROSE.
Horseshoe.

No. 208,844.    Patented Oct. 8, 1878.

Witnesses:
P. C. Dieterich.
Frank H. Duffy.

Inventor:
Thomas Penrose.
Per C. H. Watson & Co. Attorneys.

UNITED STATES PATENT OFFICE.

THOMAS PENROSE, OF CHICAGO, ILLINOIS.

IMPROVEMENT IN HORSESHOES.

Specification forming part of Letters Patent No. 208,844, dated October 8, 1878; application filed May 23, 1878.

*To all whom it may concern:*

Be it known that I, THOMAS PENROSE, of Chicago, in the county of Cook and State of Illinois, have invented certain new and useful Improvements in Horseshoes; and I do hereby declare that the following is a full, clear, and exact description thereof, which will enable others skilled in the art to which it apertains to make and use the same, reference being had to the accompanying drawings, and to the letters of reference marked theron, which form a part of this specification:

The nature of my invention consists in the construction of a horseshoe with a series of peculiarly-shaped calks on the under side, as will be hereinafter more fully set forth.

Figure 1:
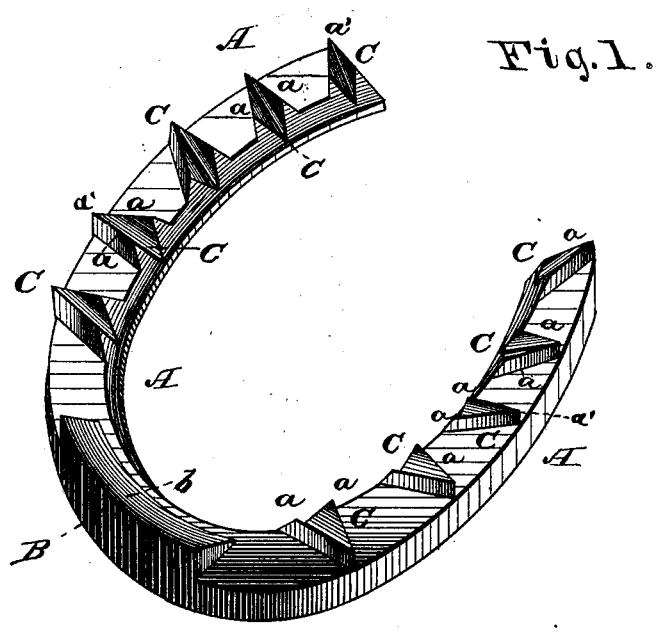
Figure 2:
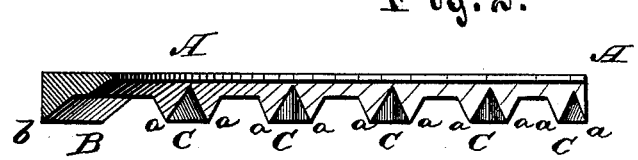
Figure 3:
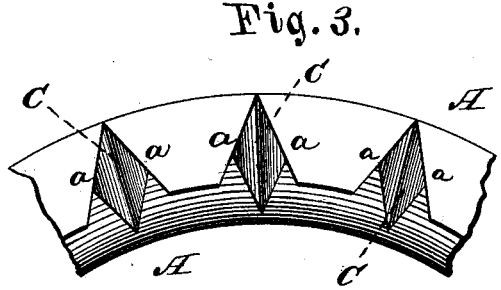

In the annexed drawing, to which reference is made, and which fully illustrates my invention, Figure 1 is a bottom prospective view of my improved horseshoe, and Fig. 2 is a detailed section of a part thereof. Fig. 3 is a top or plan view of a portion of the shoe.

A represents the body of the horseshoe, made in the usual form, and having its upper surface either level, as shown, or made in any other suitable manner, as may be deemed most advantageous.

As shown, the shoe A is, on the under side, at the toe, provided with the calk B, which forms a sharp edge at $b$. This, however, is the usual form of toe for horseshoes, and I do not claim it as my invention. It may be omitted, and the V-shaped calks, hereinafter described, used instead.

The shoe A is, on its under side, provided with a series of V-shaped calks, $c\ c$, each of which is grooved centrally, so as to present two sharp edges, $a\ a$, coming together at a point, $a'$, and diverging in opposite directions. The angle of these edges in each calk $c$ may be more or less acute, as desired.

The calks $c\ c$ may be close together or at any desired distance apart, and their points may be either pointing outward or inward.

By this construction of the shoe I obtain, as nearly as possible, an even bearing-surface, and at the same time the requisite qualities for travel on ice or smooth pavements.

The shoe may be forged in steel or iron, or cast in the same metals; and the spaces between the calks afford opportunity for nail-holes.

The outsides of the calks $c\ c$ may be either straight, as shown, or made concave.

It is evident that metal bars may be rolled with the calks thereon, and these bars then cut into blanks, to be afterward bent to form the horseshoe.

With this construction of the horseshoe it will be seen that, no matter how the hoof is put down, there will always be sharp edges to take hold on ice or pavement, thereby preventing the animal from slipping.

I am aware that horseshoes have been made with indented ridges, corrugations, and calks of various forms on the under side, extending either wholly or partially around the shoe, and I do not claim such, broadly, as my invention.

In my invention the calks are made V-shaped and grooved centrally, so that each calk forms two sharp angular edges, which come together at a point; and by this arrangement and construction one or more sharp edges and points will be presented in every direction, so as to prevent the horse from slipping.

The peculiar shape of my calks accomplishes several new results: It forms a shoe with an even bearing-surface, not only from heel to toe in a narrow line, but across the web of the shoe, and the calks are not liable to clog. They will stick where placed, presenting the acute edge to prevent slipping sidewise, and at the same time the sides of the calks are so shaped and placed that they will prevent the horse from slipping backward or forward. The calks are also convenient for sharpening with file or otherwise. By their zigzag form I, as nearly as possible, cover the face of the shoe consistent with the requirements for a shoe that will stick on ice or smooth pavement, and at the same time so form the calks that they will clear themselves of ice, &c.

For a horse suffering with corns the heel-calks are left off, thereby releasing the pressure.

My calks being so near the same all the way round in their construction, the smith can hammer down any one or more of them, the remaining ones being adapted to take the jar, not at a point, but, as nearly as practicable, across the web of the shoe.

Having thus fully described my invention, what I claim as new, and desire to secure by Letters Patent, is—

The shoe herein described, having upon its under side a series of V-shaped calks, $c\ c$, each being grooved centrally, presenting two sharp angular edges, $a\ a$, and coming together at a point, $a'$, substantially as and for the purpose set forth.

In testimony that I claim the foregoing as my own I have hereunto affixed my signature in presence of two witnesses.

THOMAS PENROSE.

Witnesses:
    JAMES BUCKLEY,
    LEWIS A. YOUNG.